May 18, 1971  J. J. CUNNINGHAM, JR  3,579,314
DUST AND SMOKE REMOVAL IN TIRE BUFFING
Filed May 20, 1969  3 Sheets-Sheet 1
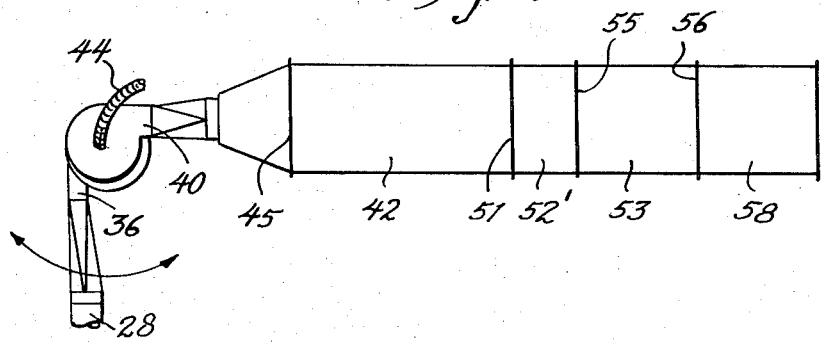
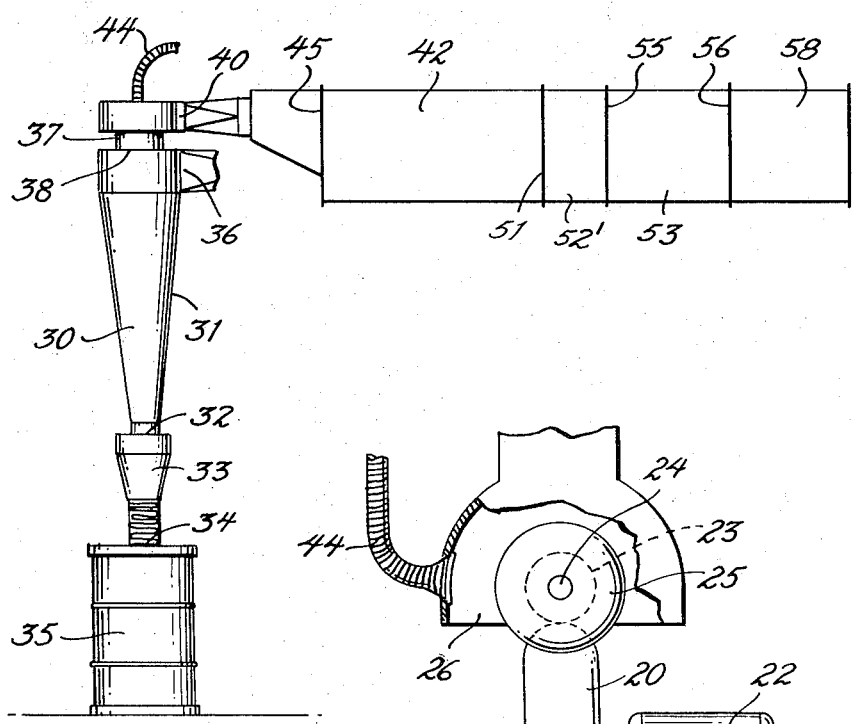
INVENTOR.
JOHN J. CUNNINGHAM
ATTORNEYS.

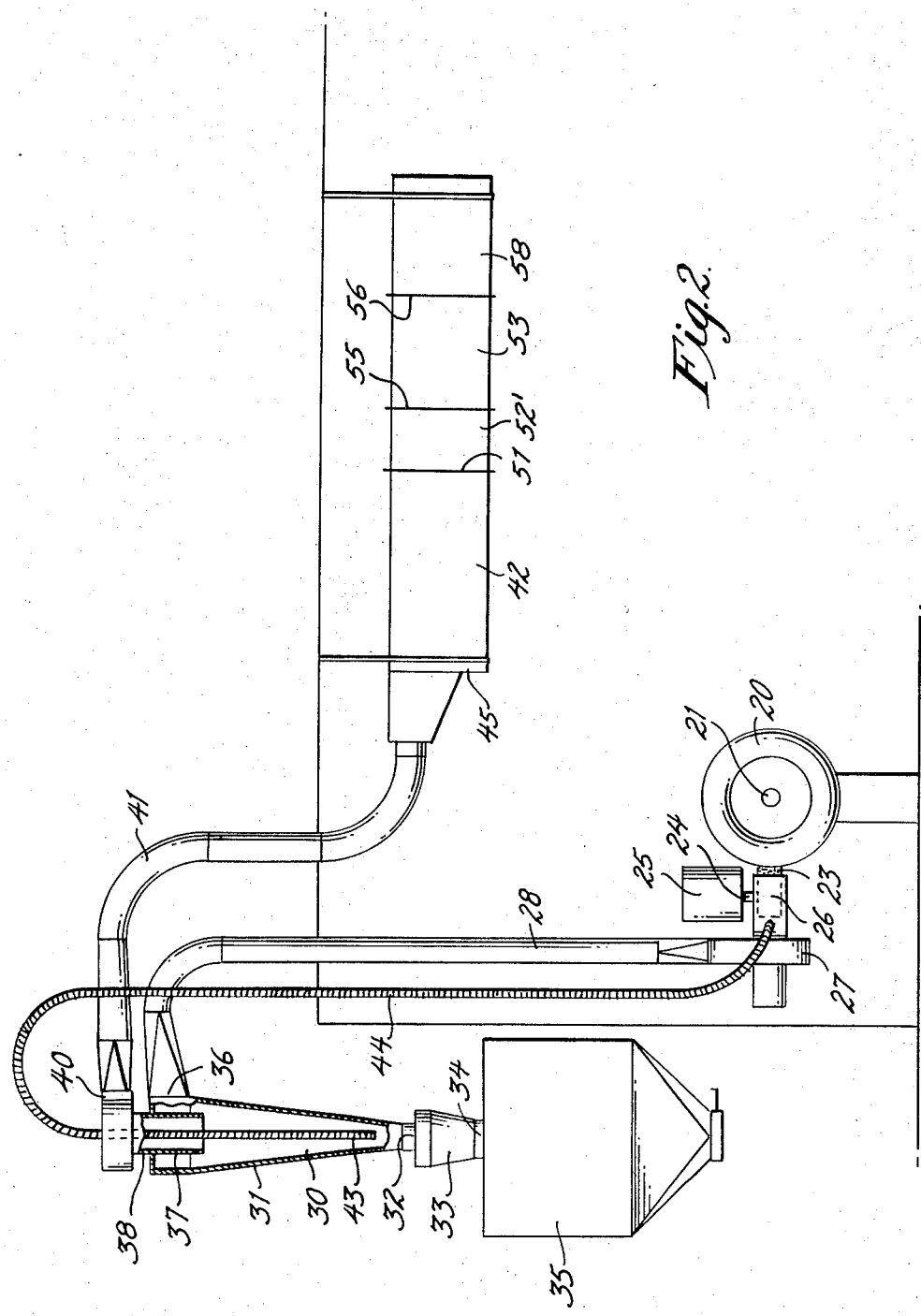

May 18, 1971  J. J. CUNNINGHAM, JR  3,579,314
DUST AND SMOKE REMOVAL IN TIRE BUFFING
Filed May 20, 1969   3 Sheets-Sheet 3
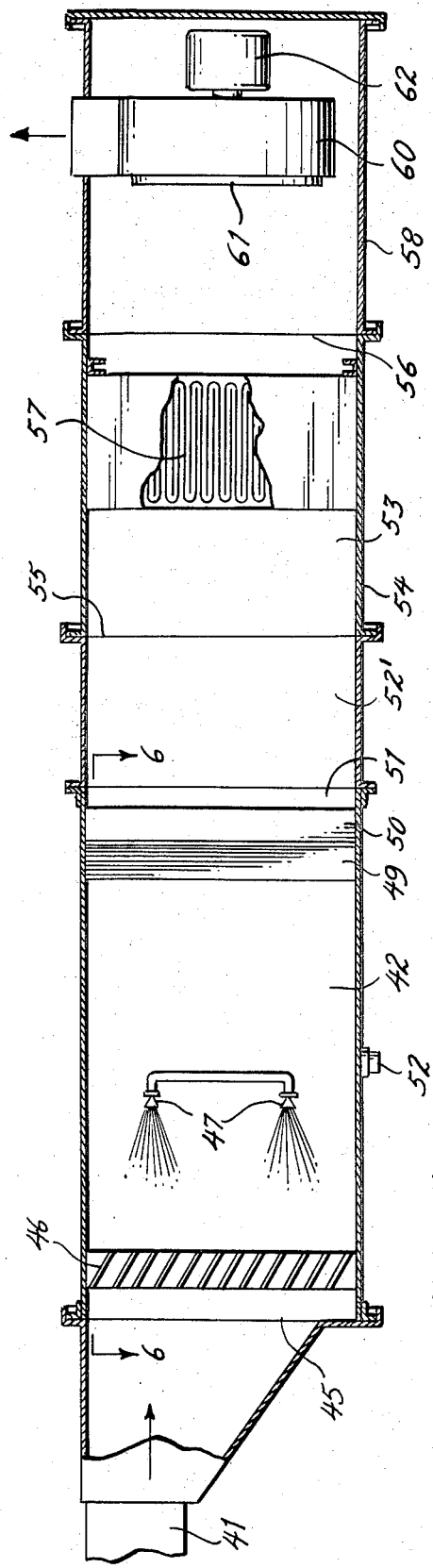
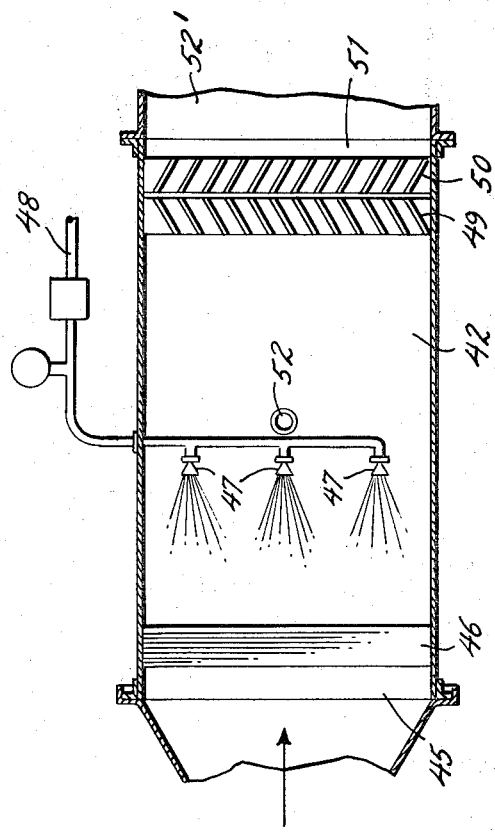
INVENTOR.
JOHN J. CUNNINGHAM
BY
ATTORNEYS.

United States Patent Office 3,579,314
Patented May 18, 1971

3,579,314
DUST AND SMOKE REMOVAL IN TIRE BUFFING
John J. Cunningham, Jr., Wilmington, Del., assignor to Quinn Brothers, Incorporated, Philadelphia, Pa.
Filed May 20, 1969, Ser. No. 826,165
Int. Cl. B24b 55/06
U.S. Cl. 51—273
2 Claims

ABSTRACT OF THE DISCLOSURE

For removing dust and smoke from tire buffing, a cyclone dust collector, a spray chamber and an absolute filter in combination. There is preferably a bypass from a high pressure point in the cyclone dust collector back to a hood adjoining the tire buffing for lengthening the time of a dust and smoke cycle.

---

The present invention relates to removing dust and smoke produced by tire buffing. It is evident that tire biffing incident to tire retreading is a very serious cause of air pollution, particularly because the dust and smoke represent a combination of gross particles, even strips of rubber, intermediate particles in the range of 2 to 10 microns, and fine smoke particles in the submicron range resulting from the actual burning of rubber in the buffing operation.

With the emphasis placed by cities on eliminating air pollution, the ability to remove dust and smoke caused by tire buffing in the process of tire retreading may be a limiting factor in the operation of tire retreading plants near cities where, of course, most of the retreading business is located.

In the prior art the combination of dust and smoke from tire retreading has proved to be a particularly difficult air pollution problem, and one which has not been readily solved by any existing piece of dust or smoke removal equipment.

I have discovered that effective removal of dust and smoke from tire buffing can be accomplished by combining a cyclone dust collector with a spray chamber and an absolute filter in that order. I have also discovered that the mechanism can be made economical by providing a bypass from a high pressure point in the cyclone dust collector which will return dust and smoke to the hood of the tire buffer so that instead of imposing all the smoke and dust collection load on the mechanism over the short period of a tire buffing cycle, for example, of the order of 30 seconds, the dust collection can be spread over several minutes, and can complete its cycle while the buffed tire is being removed from the buffer and a new tire is being placed on the buffer for buffing.

In drawings I have chosen to illustrate one only of the numerous embodiments in which the invention may appear, selecting the form shown from the standpoints of convenience in illustration, satisfactory operation and clear demonstration of the principles involved.

FIG. 1 is a diagrammatic top plan view, partially broken away, of a tire buffing mechanism, including the buffing hood.

FIG. 2 is a partially broken side elevation of the device of the invention, including the cyclone dust collector, the spray chamber and the filter.

FIG. 3 is a slightly different partial side elevation of the device of the invention.

FIG. 4 is a plan view of the device of FIG. 3.

FIG. 5 is a central vertical section through the spray chamber, filter and system suction fan of the invention.

FIG. 6 is a plan section on the line 6—6 of FIG. 5.

I show in FIG. 1 a tire 20 being buffed, mounted on a suitably horizontal spindle 21 driven by a motor 22. Conveniently located at right angles to the axis of the spindle 21, a buffing tool or rasp 23 turns on a buffing spindle 24 driven by a reversible motor 35 so as to remove the portion of the tread of a passenger, truck or airplane tire required for retreading.

A hood 26 projects above and around the buffing tool, and the hood connects with a motor driven buffer blower 27 which draws off dust and smoke from the buffing and discharges through a main dust and smoke exit channel 28.

A cyclone dust collector 30 has an inverted conical housing 31 which connects through a bottom opening 32 at the center of the small end of the cone with an expansion chamber 33 as well known. The expansion chamber at its top flares outwardly and then decreases in diameter to a bottom discharge opening 34 into a storage hopper 35 which collects a major portion of the large dust particles.

An involute inlet 36 at the top of the cone of the cyclone dust collector brings the dust and smoke from the main dust and smoke channel 28 from the hood.

As well known in cyclone dust collectors, at the center of the top intruding into the large end of the cone, there is a tubular guard 37 which is open at the bottom and extends upward through a top closure 38 of the cyclone dust collector and there connects with an involute gas outlet 40 from the cyclone dust collector which connects by a duct 41 with spray chamber 42 to be described. The direction of rotation of the involute outlet is the same as that of the inlet.

Near the axis at the lower part of the cone, where a location of high pressure exists, a bypass connection 43 is led off from the cyclone which passes, suitably through a flexible connection 44, into the side of hood 26 which initially receives the smoke and dust.

The spray chamber 42 has an inlet end 45 which is provided with water-removing baffles 46.

Located at suitable points in the spray chamber 42 are a series of spray nozzles 47 connected with a source of water 48 under pressure and spraying water toward the dust and smoke inlet 45.

The spray nozzles 47 project a stream of water which is countercurrent to and intercepts the stream of smoke and dust passing through the spray chamber. A series of double baffles 49 and 50 are located at the outlet end 51 of the spray chamber and discharge downwardly into the spray chamber, water being drained through a bottom drain 52.

The outlet end 51 of the spray chamber connects through an adapter 52' with an absolute filter 53 consisting of a housing 54 provided with an inlet end 55 and an outlet end 56, packed with absolute filter material, such as Cambridge absolute filter. At the outlet end 56 the absolute filter discharges through a system suction fan 58 having a cowling 60, a rotor 61 and a motor 62 as well known in the art.

In operation of the device, with both the buffer blower 27 and system suction fan 58 in operation to suck a stream of air through the mechanism, as the buffer 23 removes the tread from the tire, creating a great deal of dust and smoke, a stream of dust and smoke is sucked from the hood through the main dust and smoke exit channel from the buffing hood into the involute inlet at the top of the inverted conical housing of the cyclone dust collector. Operating in its well known manner, dust particles are deposited along the conical walls by the whirling stream of smoke and dust, and heavier particles enter the expansion chamber and are thrown out of the air in the expansion chamber and deposited in the storage hopper at the bottom.

Relatively pure air free from much of the dust is drawn out at the center of the top of the cyclone dust collector in the involute gas outlet, to pass to the spray chamber. A zone of higher pressure exists at the lower part of the axis of the cone and the bypass connection causes some of the smoke, which would otherwise pass directly to the spray chamber, to recirculate back into the hood through the bypass, so that even after the buffing operation has ceased, a substantial amount of the smoke has not yet reached the spray chamber but is undergoing this recirculation cycle, so that in fact the dust and smoke load on the apparatus, instead of requiring dust and smoke elimination within the period that the buffer operates, is available for treatment over a much longer period, of perhaps several minutes prior to the next buffing operation.

The stream of air carried forward by the blower and suction fan passes through a curtain of water in the spray chamber, and this tends to eliminate much of the intermediate particles, of the order of 2 to 10 microns, the particles being carried by droplets of water to the bottom of the spray chamber and out through the drain. The larger particles by this time have been deposited by the rotational effect of the cyclone dust collector.

Finally, the smoke, free from the water droplets which have been removed by the baffles in the spray chamber, passes through the absolute filter, where the relatively fine smoke particles are eliminated, so that the air which passes out through the exit end of the system suction fan is practically free from smoke particles, chiefly of a size of about 0.3 micron. In my experience, the absolute filter removes about 99.7% of the smoke particles. The absolute filter comprises a mass of paper honeycombs as well known in the art which fill the entire interior and the smoke passes through the pores, the smoke particles tending to rest against the walls.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a mechanism for removing dust and smoke from tire buffing, a buffing hood, a main dust and smoke exit channel from the buffing hood, a cyclone dust collector having an inverted conical housing, an expansion chamber connected to the lower end of the conical housing, a storage hopper connected to the lower end of the expansion chamber, an involute smoke and dust entrance to the large end of the conical housing connected to the main dust and smoke exit channel, an involute gas outlet from an interior portion of the large end of the conical housing, a spray chamber having inlet and outlet ends and having liquid spray means therein, the spray chamber being connected at its inlet end to the involute gas outlet, baffle means at the outlet end of the spray chamber for removing entrained liquid, an absolute filter having inlet and outlet ends connected at its inlet end to the outlet end of the spray chamber, and suction means for drawing air laden with dust and smoke through the cyclone dust collector, the spray chamber and the absolute filter in series in that order.

2. A device of claim 1, in combination with a bypass connection from a high pressure point near the center of the small end of the conical housing to the buffing hood for lengthening the time of a dust and smoke cycle beyond the time of a buffing cycle and reducing the dust and smoke load on the mechanism.

References Cited

UNITED STATES PATENTS

| | | | |
|---|---|---|---|
| 2,711,620 | 6/1955 | Shelby | 51—273 |
| 3,098,332 | 7/1963 | Sutton | 51—270 |

WILLIAM R. ARMSTRONG, Primary Examiner